United States Patent
Ng et al.

(10) Patent No.: US 10,867,638 B2
(45) Date of Patent: Dec. 15, 2020

(54) ULTRASONIC WELDING FOR SEALING ELECTRONIC DEVICES

(71) Applicant: Seagate Technology LLC, Cupertino, CA (US)

(72) Inventors: Ivy Ng, Singapore (SG); Teck Hoon Chua, Singapore (SG); S Selvaruban, Singapore (SG); Sok Li Goh, Singapore (SG); Chee Kwong Cheng, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/262,602

(22) Filed: Jan. 30, 2019

(65) Prior Publication Data

US 2020/0243118 A1    Jul. 30, 2020

(51) Int. Cl.
*G11B 33/14* (2006.01)
*G11B 25/04* (2006.01)

(52) U.S. Cl.
CPC ........ *G11B 33/1466* (2013.01); *G11B 25/043* (2013.01); *G11B 33/1453* (2013.01)

(58) Field of Classification Search
CPC .............. G11B 33/1466; G11B 25/043; G11B 33/1453
See application file for complete search history.

(56) References Cited

U.S. PATENT DOCUMENTS

| | | | | |
|---|---|---|---|---|
| 5,512,725 A * | 4/1996 | Kelemen | G11B 25/043 |
| | | | 219/121.64 |
| 5,751,514 A * | 5/1998 | Hyde | G11B 5/4853 |
| | | | 360/97.21 |
| 5,751,519 A * | 5/1998 | Hata | G11B 5/4813 |
| | | | 360/265.6 |
| 5,880,904 A * | 3/1999 | Mizoshita | G11B 19/20 |
| | | | 360/97.16 |
| 6,125,016 A * | 9/2000 | Lin | G11B 25/043 |
| | | | 360/264.8 |
| 6,664,663 B1 * | 12/2003 | Yeo | G11B 5/4813 |
| | | | 310/12.08 |
| 7,119,984 B2 * | 10/2006 | Macleod | B23K 26/12 |
| | | | 360/99.18 |
| 7,420,782 B2 * | 9/2008 | Kawakami | G11B 5/5569 |
| | | | 360/264.7 |
| 7,549,210 B2 * | 6/2009 | Teo | G11B 25/043 |
| | | | 264/272.2 |
| 8,279,552 B2 * | 10/2012 | Stipe | G11B 25/043 |
| | | | 360/99.18 |
| 8,730,623 B2 * | 5/2014 | Ho | G11B 5/5569 |
| | | | 360/265.6 |
| 8,837,080 B2 * | 9/2014 | McGuire, Jr. | G11B 25/043 |
| | | | 360/97.19 |
| 8,854,766 B1 | 10/2014 | Gustafson et al. | |

(Continued)

FOREIGN PATENT DOCUMENTS

JP    2011-240934 A    12/2011

*Primary Examiner* — Brian E Miller
(74) *Attorney, Agent, or Firm* — Faegre Drinker Biddle & Reath

(57) ABSTRACT

A hard disc drive includes a base deck, a cover welded to the base deck, and a voice coil motor. The voice coil motor includes a first voice coil motor assembly and a second voice coil motor assembly. Either one or both of the first and second voice coil motor assemblies can be welded to the base deck.

20 Claims, 10 Drawing Sheets

(56) References Cited

U.S. PATENT DOCUMENTS

| | | | |
|---|---|---|---|
| 9,001,458 B1 * | 4/2015 | Vitikkate | G11B 25/043 360/97.22 |
| 9,183,889 B1 | 11/2015 | Smyth et al. | |
| 9,208,825 B1 | 12/2015 | Gustafson et al. | |
| 9,293,169 B2 | 3/2016 | Andrikowich et al. | |
| 9,508,393 B1 | 11/2016 | Le et al. | |
| 9,522,446 B2 * | 12/2016 | Law | B21K 23/00 |
| 9,601,161 B2 | 3/2017 | McGuire, Jr. et al. | |
| 9,711,187 B1 * | 7/2017 | Okamoto | G11B 33/1446 |
| 9,747,956 B1 * | 8/2017 | Kaneko | G11B 33/022 |
| 9,779,779 B1 * | 10/2017 | Okamoto | G11B 33/1446 |
| 9,786,330 B1 * | 10/2017 | Usami | G11B 33/027 |
| 9,818,453 B1 * | 11/2017 | Lapp | G11B 33/1486 |
| 9,870,803 B2 | 1/2018 | Albrecht et al. | |
| 10,002,645 B2 | 6/2018 | McGuire, Jr. | |
| 10,079,043 B2 * | 9/2018 | Strange | G11B 25/043 |
| 2001/0053047 A1 * | 12/2001 | Seetoh | G11B 5/486 360/244.1 |
| 2002/0039260 A1 * | 4/2002 | Kilmer | G11B 5/5521 360/264.7 |
| 2002/0063998 A1 * | 5/2002 | Kazmierczak | G11B 5/4813 360/264.9 |
| 2003/0226828 A1 * | 12/2003 | Arya | B23K 11/002 219/121.64 |
| 2004/0232782 A1 * | 11/2004 | Xu | G11B 19/2009 310/67 R |
| 2005/0057860 A1 * | 3/2005 | Lau | G11B 5/4813 360/265.7 |
| 2005/0063095 A1 * | 3/2005 | Matsumura | G11B 5/4826 360/244.5 |
| 2005/0068666 A1 * | 3/2005 | Albrecht | G11B 33/1466 360/99.18 |
| 2005/0081384 A1 * | 4/2005 | Inoue | F16C 43/02 29/898.02 |
| 2007/0086686 A1 * | 4/2007 | Ishikawa | F16C 17/026 384/100 |
| 2007/0170805 A1 * | 7/2007 | Tamaoka | H02K 1/148 310/216.054 |
| 2008/0165448 A1 * | 7/2008 | Ichikawa | G11B 25/043 360/97.22 |
| 2010/0188781 A1 * | 7/2010 | Ono | G11B 5/5569 360/274 |
| 2012/0113548 A1 * | 5/2012 | Yamada | G11B 5/5569 360/264.9 |
| 2012/0275105 A1 | 11/2012 | McGuire, Jr. | |
| 2013/0163114 A1 * | 6/2013 | Jeon | G11B 5/5573 360/75 |

* cited by examiner

ULTRASONIC WELDING FOR SEALING ELECTRONIC DEVICES

SUMMARY

In certain embodiments, a hard disc drive includes a base deck, a cover welded to the base deck, and a voice coil motor. The voice coil motor includes a first voice coil motor assembly and a second voice coil motor assembly. Either one or both of the first and second voice coil motor assemblies can be welded to the base deck.

In certain embodiments, a method for manufacturing a hard disc drive is disclosed. The hard disc drive includes a base deck, a cover coupled to the base deck, and first and second voice coil motor assemblies. The method includes applying ultrasonic acoustic energy along a first area where the cover and the base deck contact each other to fuse the cover to the base deck. The method further includes applying ultrasonic acoustic energy along a second area where the first and second voice coil motor assemblies contact the base deck to fuse the first and second voice coil motor assemblies to the base deck.

In certain embodiments, a method for sealing a hard disc drive with a base deck and a cover is disclosed. The method includes at least partially wrapping the hard disc drive with a foil sheet and applying ultrasonic acoustic energy to a portion of the foil sheet and the base deck to fuse the portion of the foil sheet to the base deck.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
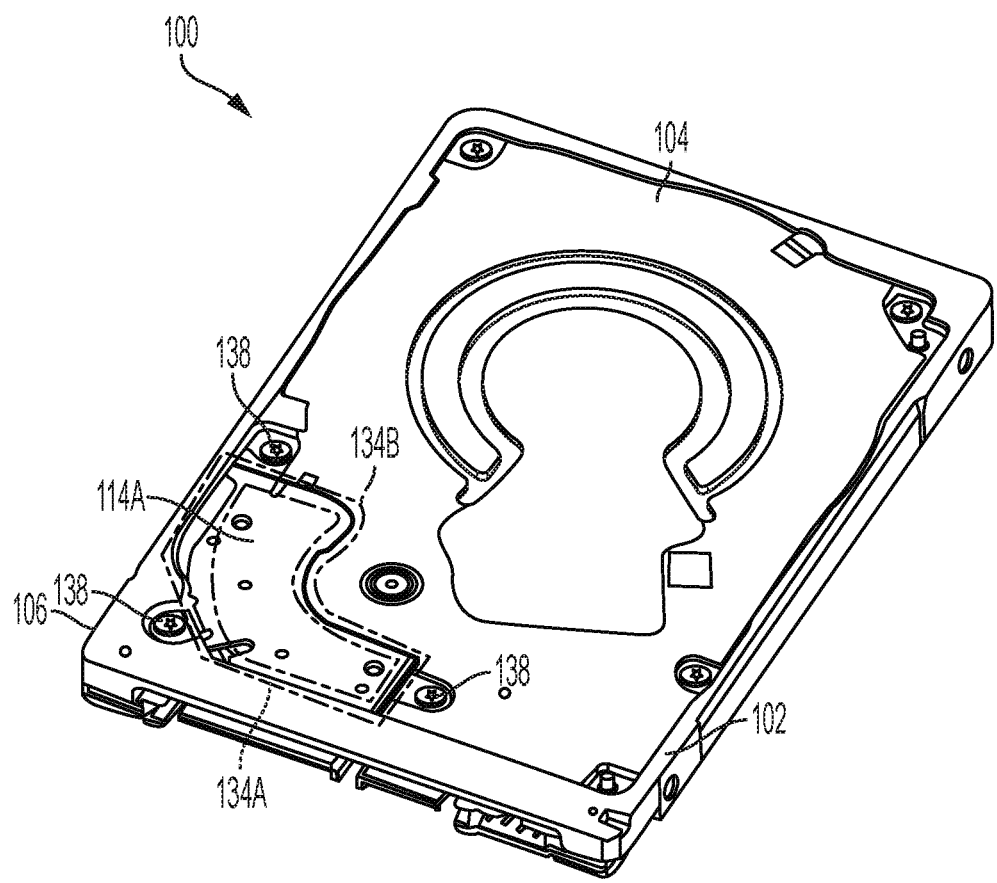
FIG. 1 shows a perspective view of a hard disc drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices, like hard disc drives, can be filled with air or a gas like helium and sealed to control and maintain a storage device's internal environment. Although typical gasket-based seals for data storage devices can prevent debris from entering the devices, these gaskets may not be sufficient to prevent moisture entering or escaping from the devices. For example, the gaskets used at the interface between a base deck and a cover may permit, over time, an undesirable amount of moisture to enter the data storage devices. Excess moisture can affect performance of hard disc drives, including hard disc drives that incorporate heat-assisted magnetic recording (HAMR). Some attempts to seal hard disc drives involve laser welding, friction-stir welding, and adhesive-filled labyrinths—each of which presents unique manufacturing challenges. For example, both laser welding and friction-stir welding are difficult to implement in smaller form factors or thinner hard disc drives because the heat and/or pressure subjected by those processes on the hard disc drives can melt or otherwise deform the smaller hard disc drives. The inventors of the present disclosure have found that data storage devices can be sealed to prevent moisture leakage using ultrasonic welding to create metal-to-metal bonds. Certain embodiments of the present disclosure are accordingly directed to systems, devices, and methods directed to sealing data storage devices using ultrasonic welding.

Figure 2:
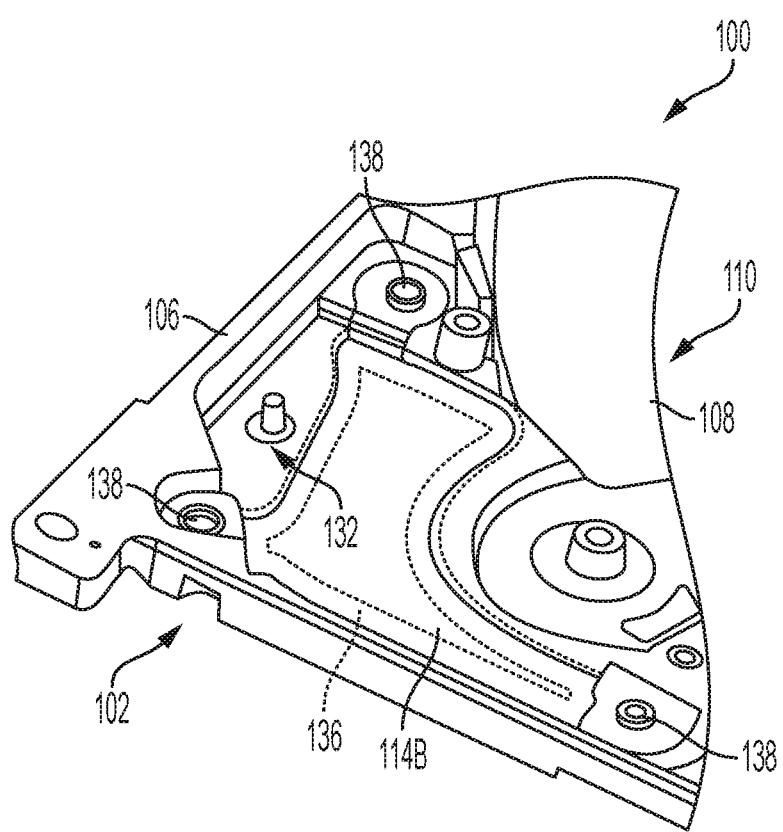
FIG. 2 shows a partial, perspective view of the hard disc drive of FIG. 1, in accordance with certain embodiments of the present disclosure.

FIG. 1 shows a hard disc drive 100 including a base deck 102 and a cover 104 coupled to the base deck 102. FIG. 2 shows the base deck 102 without the cover 104. As shown in FIG. 2, the base deck 102 includes side walls (e.g., side wall 106) that, together with a bottom portion 108 of the base deck 102 and the cover 104, create an internal cavity 110 that may house data storage components like a voice coil motor (VCM) 112, magnetic recording media, a spindle motor, etc.

Figure 3:
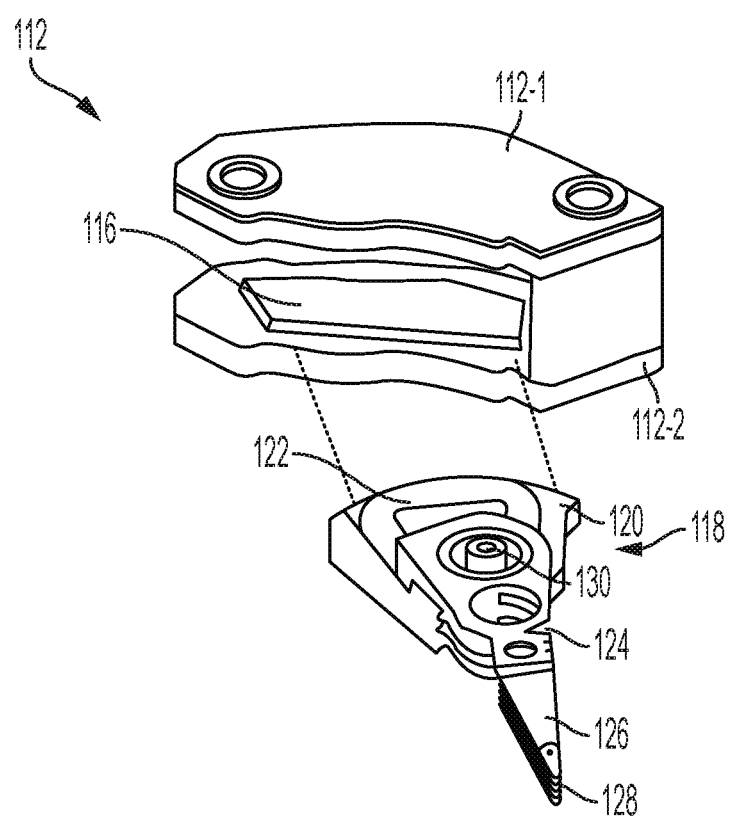
FIG. 3 shows a perspective view of a voice coil motor, in accordance with certain embodiments of the present disclosure.

FIG. 3 shows various features of an exemplary VCM 112, which includes a top VCM assembly 112-1 and a bottom VCM assembly 112-2 and which can be incorporated into hard disc drives. The hard disc drive 100 of FIGS. 1 and 2 includes a top VCM assembly 114A and a bottom VCM assembly 114B. Both the top VCM assembly (112-1 or 114A) and the bottom VCM assembly (112-2 or 114B) can be coupled to a permanent magnet 116. When the hard disc drive 100 is assembled, a head stack assembly (HSA) 118, sometimes referred to as an E-block because of its E-shaped side profile, is partially positioned between the top VCM assembly (112-1 or 114A) and the bottom VCM assembly (112-2 or 114B). For example, the HSA 118 can include a shelf 120 to which a coil 122 is attached, and the shelf 120 and the coil 122 can be at least partially positioned between the top VCM assembly (112-1 or 114A) and the bottom VCM assembly (112-2 or 114B). The HSA 118 includes one or more arms 124, suspensions 126, and read/write heads 128 positioned at or near a distal end of the HSA 118. The HSA 118 can be rotatably coupled to the base 104 by a bearing 130 such that the HSA 118 can pivot around the bearing 130.

During operation of the hard disc drive 100, the drive's spindle motor rotates the magnetic recording media while the HSA 118 is driven by the VCM 112 to pivot around the bearing 130. A servo control system controls rotation of the HSA 118 via the VCM 112 to position the read/write heads 128 over a desired track on the magnetic recording media for reading and writing operations. For example, the servo control system controls an amount of current applied to the coil 122 on the shelf 120 which creates a magnetic field that interacts with the magnetic fields of the permanent magnets on the top VCM assembly (112-1 or 114A) and the bottom VCM assembly (112-2 or 114B).

As shown in FIG. 1, the top VCM assembly 114A is positioned between the base deck 102 and the cover 104. The bottom VCM assembly 114B, shown in FIG. 2, is positioned within an aperture 132 on the base deck 102. In certain embodiments, the outer surfaces (or exterior-facing surfaces) of the VCM assemblies 114A and 114B are flush with the outer surfaces (or exterior-facing surfaces) of the respective base deck 102 and the cover 104. Positioning the VCM assemblies 114A and 114B in this manner can help reduce the overall height of the VCM 112 compared to other approaches where the VCM 112 is fully positioned between the base deck 102 and the cover 104. Although both the top VCM assembly 114A and the bottom VCM assembly 114B are shown as being positioned within, for example, the aperture 132; certain embodiments can feature only one of the VCM assemblies 114A and 114B positioned in the manner shown in FIGS. 1 and 2. For example, the bottom VCM assembly 114B may be positioned in the aperture 132 and welded to the base deck 102, while the top VCM assembly 114A is fully positioned within the internal cavity 110 of the hard disc drive 100.

In certain embodiments, the top VCM assembly 114A and the bottom VCM assembly 114B are welded to the base deck 102 and/or the cover 104 by, for example, ultrasonic welding. In addition, in certain embodiments, the base deck 102 and the cover 104 are welded to each other by, for example, ultrasonic welding. Welding the various components to each other creates a metal-to-metal bond (e.g., a metal-to-metal fusion zone) that is less susceptible to letting moisture pass compared to traditional gasket-based sealing approaches. As such, welding helps create a moisture barrier along interfaces of components of the hard disc drive 100.

Figure 4:
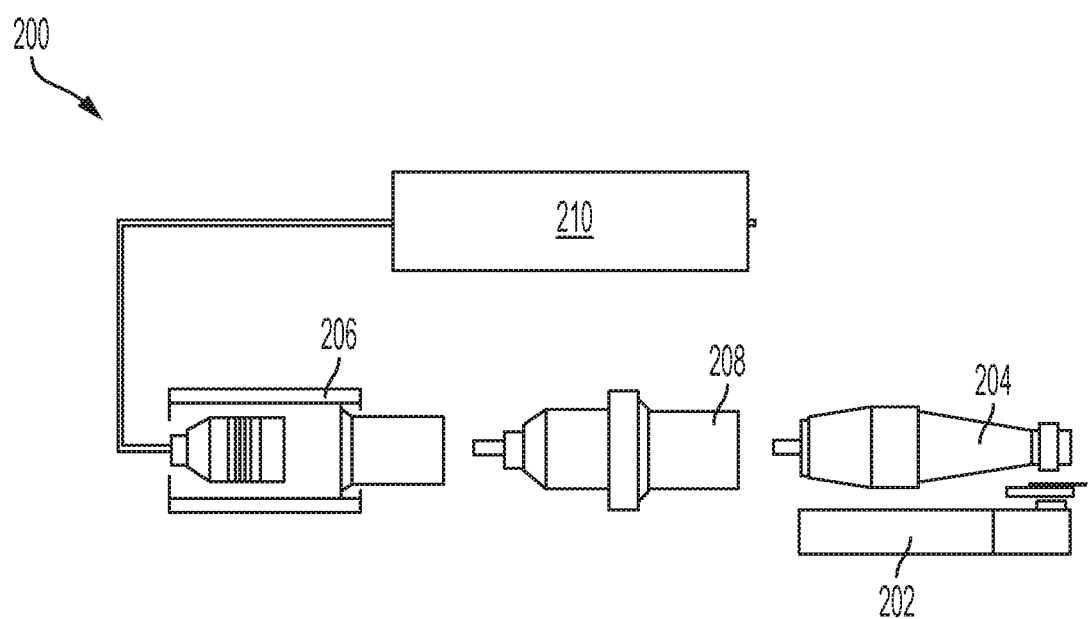
FIG. 4 shows a schematic of an ultrasonic welding system, in accordance with certain embodiments of the present disclosure.

FIG. 4 shows a schematic of an ultrasonic welding system 200, which includes an anvil 202 (e.g., a chuck), a horn 204 (e.g., a welding horn; sonotrode), a transducer 206, a booster 208, and a controller 210.

During ultrasonic welding, the anvil 202 holds one or more of the work pieces (e.g., component of the hard disc drive 100) to be welded. The work pieces are welded together by directing high-frequency (e.g., ultrasonic) acoustic vibrations to a desired area of the work pieces to be welded. The vibrations are applied by the horn 204. For example, the work pieces are clamped between the anvil 202 and the horn 204 while a high-frequency vibration or oscillation is directed through the horn 204 to the work pieces. The vibration creates surface friction at or along interfacing surfaces of the workpieces which softens the interfacing surfaces. As the work pieces cool, the interfacing surfaces bond together.

The ultrasonic welding system's transducer 206 converts electrical energy to mechanical energy, and the booster 208 magnifies the vibration transmitted through the horn 204. The controller 210 controls the amount of power to the transducer 206 such that the horn 204 vibrates at desired frequencies. In certain embodiments, the horn 204 includes knurls to help grip the work piece.

Figure 5:
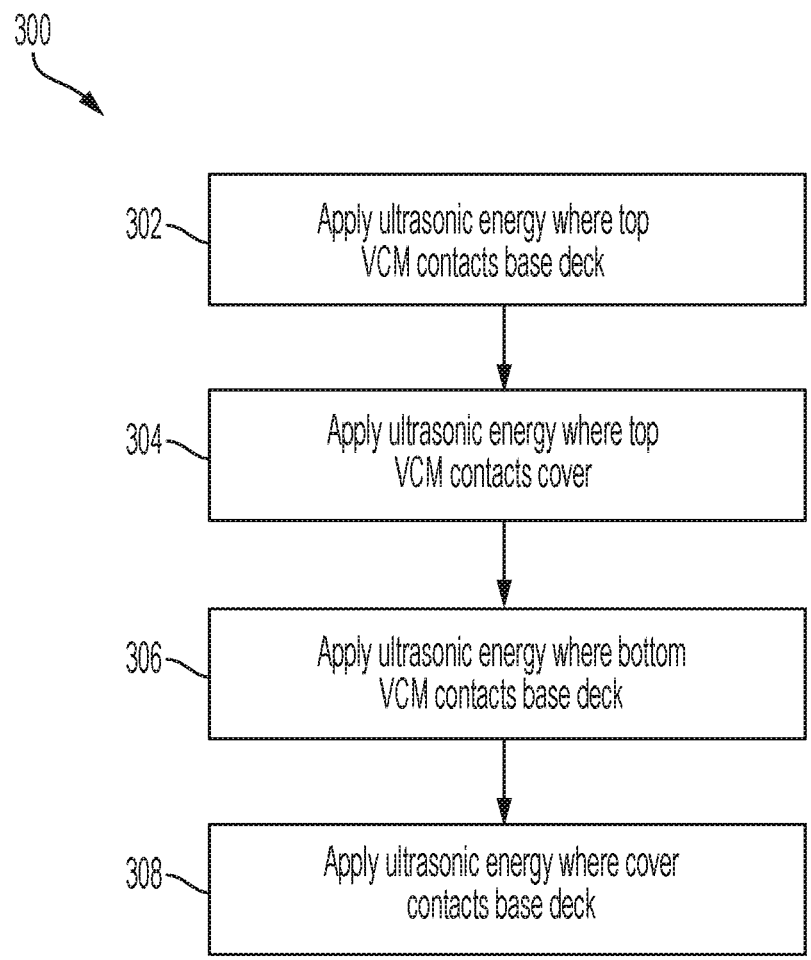
FIG. 5 shows a block representation of steps in a method for sealing hard disc drives, in accordance with certain embodiments of the present disclosure.

FIG. 5 shows various steps of a method 300 for sealing features of the hard disc drive 100 (or other storage devices or hard disc drive embodiments). The steps do not need to be performed in the order shown in FIG. 5 and described below.

Step 302 includes applying ultrasonic acoustic energy along an area 134A (shown in FIG. 1) where the top VCM assembly 114A contacts the base deck 102 to create a metal-to-metal bond between the top VCM assembly 114A and the base deck 102 along the area 134A. Ultrasonic acoustic energy can also be applied along an area 134B (shown in FIG. 1) where the top VCM assembly 114A contacts the cover 104 (step 304). As one non-limiting example, a portion of a periphery of the top VCM assembly 114A can be fused to the cover 104, and another portion of the periphery can be fused to the base deck 102. In certain embodiments, a portion of the top VCM assembly 114A extends within the internal cavity 110 of the hard disc drive 100 and is welded to the cover 104. The metal-to-metal bond is created between the top VCM assembly 114A and the cover 104 along the area 134B. As such, the top VCM assembly 114A is welded to both the base deck 102 and the cover 104 to create a moisture barrier between the interfaces of those components.

Step 306 includes applying ultrasonic acoustic energy along an area 136 (shown in FIG. 2) where the bottom VCM assembly 114B contacts the base deck 102 to create a metal-to-metal bond between the bottom VCM assembly 114B and the base deck 102 along the area 136. As such, the bottom VCM assembly 114B is welded to the base deck 102 to create a moisture barrier between the interfaces of those components. In one non-limiting example, part or all of a periphery of the bottom VCM assembly 114B can be fused to the base deck 102. As shown in both FIGS. 1 and 2, the top VCM assembly 114A and the bottom VCM assembly 114B can also be coupled to the respective base deck 102 and the cover 104 via fasteners 138. The fasteners 138 may be installed prior to welding so that the top VCM assembly 114A and the bottom VCM assembly 114B are held in position during the application of the ultrasonic acoustic energy.

Step 308 includes applying ultrasonic acoustic energy along an area where the base deck 102 and the cover 104 contact each other to create a metal-to-metal bond between the base deck 102 and the cover 104. As such, the base deck 102 and the cover 104 are welded to each other to create a moisture barrier between the interfaces of those components.

In certain embodiments, the various components being welded together are comprised of dissimilar materials. For example, the base deck 102 can comprise aluminum while the cover 104 comprises steel (e.g., galvanized steel, stainless steel). The VCM assemblies can comprise yet a different material than the base deck 102 and the cover 104. In certain embodiments, one or more of the welded components include a copper plating. For example, the base deck 102 and/or the cover 104 can be plated with copper where the components are welded together.

Figure 6:
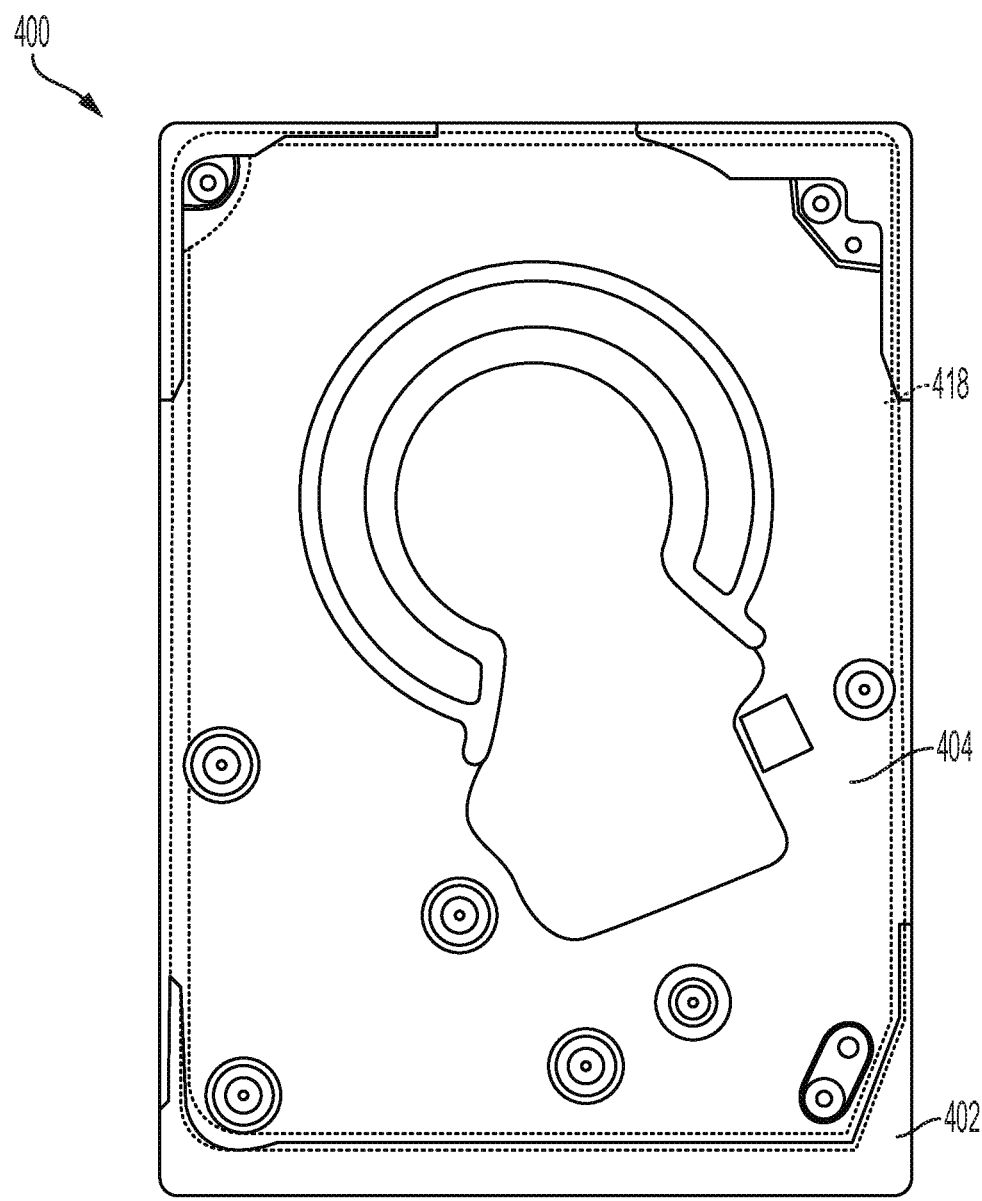
FIG. 6 shows a top view of a hard disc drive, in accordance with certain embodiments of the present disclosure.
Figure 7:
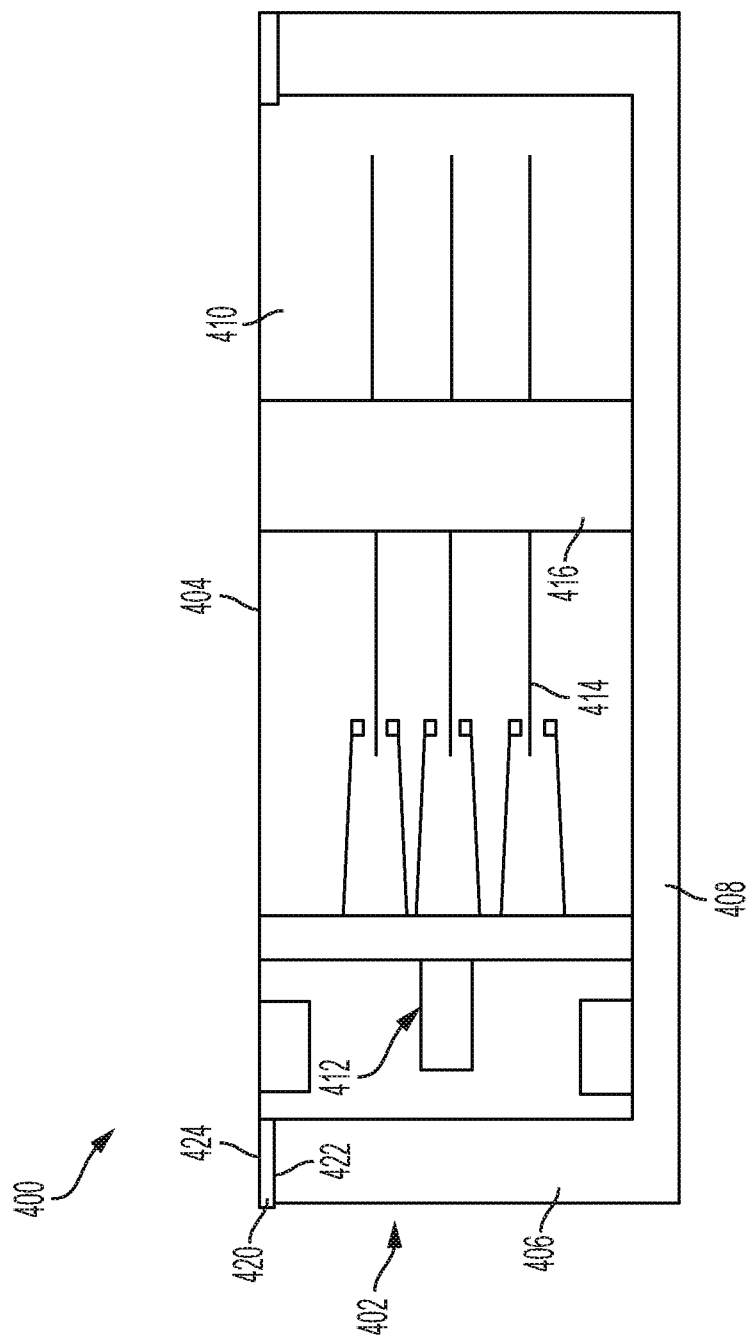
FIG. 7 shows a schematic of a side section view of the hard disc drive of FIG. 6, in accordance with certain embodiments of the present disclosure.

FIG. 6 shows a hard disc drive 400 including a base deck 402 and a cover 404 coupled to the base deck 402. FIG. 7 shows a side sectional view of the base deck 402 and the cover 404. As shown in FIG. 7, the base deck 402 includes side walls (e.g., side wall 406) that, together with a bottom portion 408 of the base deck 402 and the cover 404, create an internal cavity 410 that may house data storage components like a VCM 412, magnetic recording media 414, a spindle motor 416, etc. As shown in FIG. 6, unlike the hard disc drive 100 of FIG. 1, the hard disc drive 400 does not include components of the VCM 412 positioned within apertures of the base deck 402 or the cover 404. Instead, the components of the VCM 412 are positioned within the internal cavity 410 of the hard disc drive 400.

The hard disc drive 400 can be sealed by welding the cover 404 to the base deck 402. For example, FIG. 6 shows an area 418 (outlined via dotted lines) along which the cover 404 can be welded to the base deck 402. The weld can be created by applying ultrasonic energy along the area 418 such that a metal-to-metal bond is created between the base deck 402 and the cover 404. FIG. 7 schematically shows a bond 420 between two interfacing surfaces of the base deck 402 and the cover 404: an upper surface 422 of the sidewalls 406 of the base deck 402 and a bottom surface 424 of the cover 404. In certain embodiments, the base deck 402 comprises a material such as aluminum while the cover 404 comprises a material such as steel. In such embodiments, when ultrasonic energy is applied along the area 418, the steel of the cover 404 fuses with the aluminum of the base deck 402 to create a moisture barrier.

Figure 8:
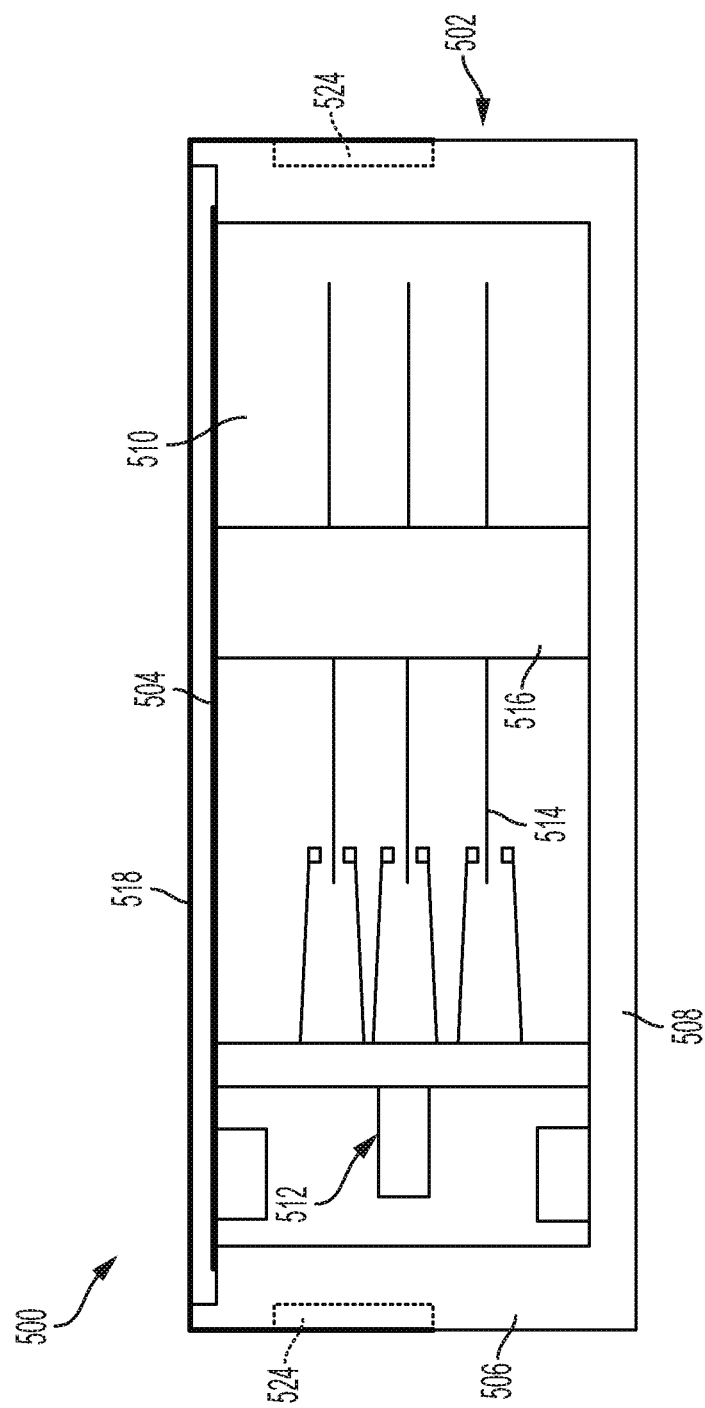
FIG. 8 shows a side section view of the hard disc drive of FIG. 1, in accordance with certain embodiments of the present disclosure.

FIG. 8 shows a hard disc drive 500 including a base deck 502 and a cover 504 coupled to the base deck 502. The base deck 502 includes side walls (e.g., side wall 506) that, together with a bottom portion 508 of the base deck 502 and the cover 504, create an internal cavity 510 that may house data storage components like a VCM 512, magnetic recording media 514, a spindle motor 516, etc.

Figure 9:
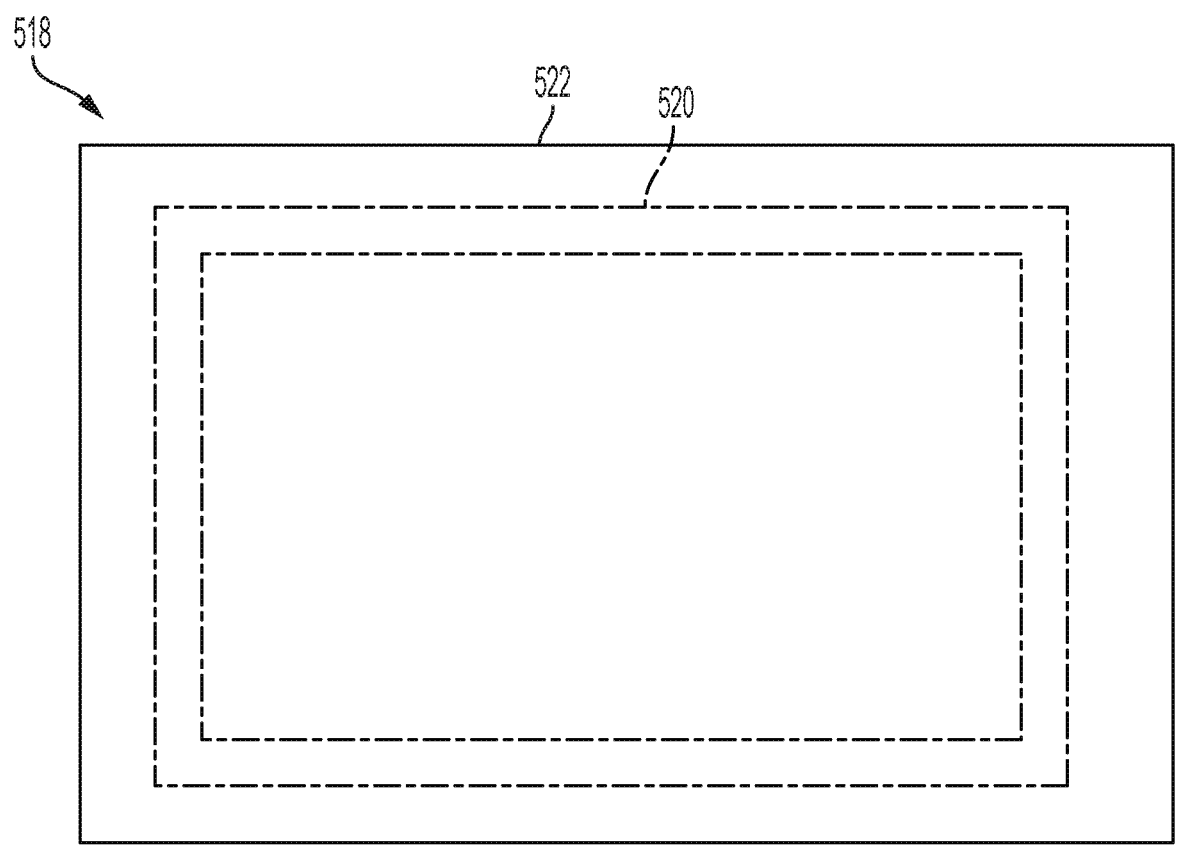
FIG. 9 shows a top view of a sheet of foil, in accordance with certain embodiments of the present disclosure.

The hard disc drive 500 also includes one or more foil sheets 518, which is shown in an unwrapped form in FIG. 9. The foil sheet 518 can include various knurl patterns in an area 520 near the periphery 522 of the foil sheet 518. The knurls formed on the foil sheet 518 can make welding the foil sheet 518, via ultrasonic welding, more effective and/or quicker. In certain embodiments, example thicknesses of the foil sheet 518 includes ranges such as 0.01-2 mm and 0.05-0.1 mm.

In certain embodiments, the foil sheet 518 is at least partially wrapped around the base deck 502 and welded to the base deck 502. For example, the foil sheet 518 can be welded to the sidewalls 506 of the base deck 502 via ultrasonic welding. As shown schematically in FIG. 8, the foil sheet 518 is welded to the sidewalls 506 along an area 524 of the sidewalls 506 to create a metal-to-metal bond within the area 524. The area 524 may extend along an entirety of a circumference of the base deck 102 to form a continuous weld. In certain embodiments, the knurls in the area 520 overlap with the area 524 welded to the base deck 502. The bond creates a moisture barrier around the base deck 502. In certain embodiments, the foil sheet 518 is wrapped around the base deck 502 and welded to the bottom portion 508 of the base deck 502. In certain embodiments, the base deck 502 comprises a material such as aluminum while the foil sheet 518 also comprises a material such as aluminum. In certain embodiments, the base deck 502 comprises a different type of aluminum (e.g., aluminum alloys such as 6061, 5052, and A308) than the aluminum of the foil sheet 518 (e.g., aluminum alloys such as 1100 series aluminum, 1200 series aluminum). When ultrasonic energy is applied along the area 524, the aluminum of the foil sheet 518 fuses with the aluminum of the base deck 502 to create a moisture barrier.

Figure 10:
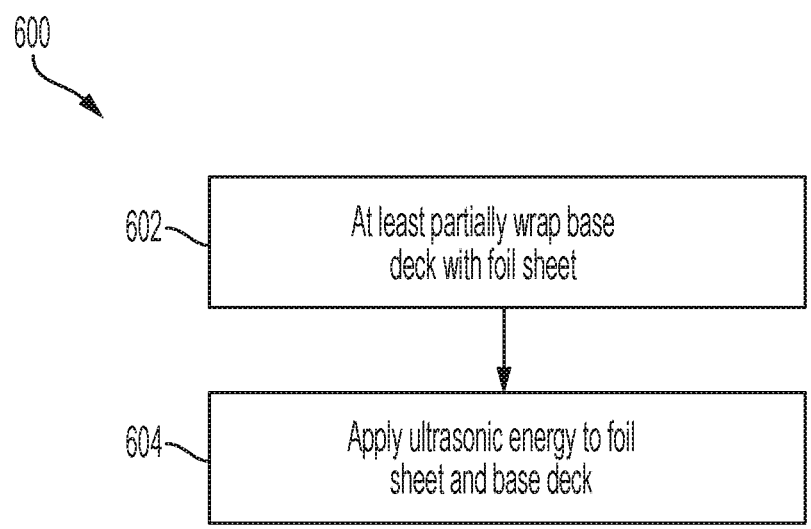
FIG. 10 shows a block representation of steps in a method for sealing hard disc drives, in accordance with certain embodiments of the present disclosure.

FIG. 10 shows various steps of a method 600 for sealing features of the hard disc drive 500 (or other storage devices or hard disc drive embodiments).

Step 602 includes at least partially wrapping the hard disc drive with the foil sheet 518. Step 604 includes applying ultrasonic acoustic energy to a portion of the foil sheet 518 and the base deck 502. The applied ultrasonic acoustic energy creates surface friction at or along interfacing surfaces of the foil sheet 518 and the base deck 502 to fuse the portion of the foil sheet 518 to the base deck 502. The metal-to-metal bond between the base deck 502 and the foil sheet 518 creates a moisture barrier between the interfaces of those components.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disc drive comprising:
   a base deck;
   a cover welded to the base deck; and
   a voice coil motor including a first voice coil motor assembly and a second voice coil motor assembly, wherein both the first and second voice coil motor assemblies are welded to the base deck and the first voice coil motor assembly is welded to the cover.

2. The hard disc drive of claim 1, wherein the second voice coil motor assembly is welded only to the base deck.

3. The hard disc drive of claim 1, wherein the base deck includes a bottom portion and sidewalls extending from the bottom portion, wherein the sidewalls have an upper surface facing the cover, wherein the cover is welded to the base deck along the upper surface.

4. The hard disc drive of claim 1, wherein at least a periphery of one or more of the first and second voice coil motor assemblies is welded to the base deck.

5. The hard disc drive of claim 1, wherein an entire periphery of the second voice coil motor assembly is welded to the base deck.

6. The hard disc drive of claim 1, wherein an outer surface of the first voice coil motor assembly is flush with an outer surface of the cover.

7. The hard disc drive of claim 1, wherein the base deck comprises aluminum, wherein the cover comprises steel.

8. A hard disc drive comprising:
   a base deck;
   a cover welded to the base deck; and
   a voice coil motor including a first voice coil motor assembly and a second voice coil motor assembly, wherein the first voice coil motor assembly is welded to the base deck and to the cover.

9. The hard disc drive of claim 8, wherein both the first and second voice coil motor assemblies are welded to the base deck.

10. The hard disc drive of claim 8, wherein at least a periphery of one or more of the first and second voice coil motor assemblies is welded to the base deck.

11. The hard disc drive of claim 8, wherein an entire periphery of the second voice coil motor assembly is welded to the base deck.

12. The hard disc drive of claim 8, further comprising:
a head-stack assembly including a coil that is positioned between the first and second voice coil motor assemblies.

13. The hard disc drive of claim 12, further comprising:
a bearing coupled to the head-stack assembly such that the head-stack assembly can pivot.

14. The hard disc drive of claim 8, wherein an outer surface of the first voice coil motor assembly is flush with an outer surface of the cover.

15. The hard disc drive of claim 8, wherein the base deck comprises aluminum, wherein the cover comprises steel.

16. A hard disc drive comprising:
a base deck;
a cover welded to the base deck; and
a voice coil motor including a first voice coil motor assembly and a second voice coil motor assembly, wherein a first portion of a periphery of the first voice coil motor assembly is fused to the base deck and a second portion of the periphery is fused to the cover, and wherein an entire periphery of the second voice coil motor assembly is fused to the base deck.

17. The hard disc drive of claim 16, wherein an outer surface of the first voice coil motor assembly is flush with an outer surface of the cover.

18. The hard disc drive of claim 16, wherein the base deck includes a bottom portion and sidewalls extending from the bottom portion, wherein the sidewalls have an upper surface facing the cover, wherein the cover is welded to the base deck along the upper surface.

19. The hard disc drive of claim 16, further comprising:
a head-stack assembly including a coil that is positioned between the first and second voice coil motor assemblies.

20. The hard disc drive of claim 16, wherein the base deck comprises aluminum, wherein the cover comprises steel.

* * * * *